United States Patent [19]
Hoemann

[11] Patent Number: 6,133,663
[45] Date of Patent: Oct. 17, 2000

[54] BRUSHLESS PERMANENT MAGNET MACHINE

[75] Inventor: Keith I. Hoemann, Fenton, Mo.

[73] Assignee: A. O. Smith Corporation, Milwaukee, Wis.

[21] Appl. No.: 09/285,155

[22] Filed: Apr. 1, 1999

[51] Int. Cl.[7] .............................. H02K 3/00; H02K 3/28
[52] U.S. Cl. ...................... 310/180; 310/156; 310/179; 310/261; 310/165
[58] Field of Search ................................. 310/156, 160, 310/162, 166, 165, 179, 180, 184, 185, 261, 254

[56] References Cited

U.S. PATENT DOCUMENTS

| | | | |
|---|---|---|---|
| 4,242,610 | 12/1980 | McCarty et al. | 310/156 |
| 4,568,846 | 2/1986 | Kapadia | 310/156 |
| 4,634,906 | 1/1987 | Grosjean | 310/49 R |
| 4,709,179 | 11/1987 | Banon et al. | 310/156 |
| 4,769,567 | 9/1988 | Kurauchi et al. | 310/156 |
| 4,845,837 | 7/1989 | Lloyd | 29/598 |
| 5,034,642 | 7/1991 | Hoemann et al. | 310/156 |
| 5,097,166 | 3/1992 | Mikulic | 310/156 |
| 5,510,662 | 4/1996 | Tanimoto et al. | 310/156 |
| 5,652,470 | 7/1997 | von der Heide et al. | 310/67 R |
| 5,723,930 | 3/1998 | Ho et al. | 310/179 |
| 5,751,089 | 5/1998 | Stridsberry | 310/266 |
| 5,818,139 | 10/1998 | Yamagiwa et al. | 310/156 |

FOREIGN PATENT DOCUMENTS

| | | | |
|---|---|---|---|
| 449538 | 10/1991 | European Pat. Off. | H02K 21/14 |
| 823771 | 2/1998 | European Pat. Off. | H02K 21/16 |
| 4033454 | 4/1992 | Germany | H02K 1/27 |
| 5-115139 | 5/1993 | Japan | H02K 1/27 |
| 9-84283 | 3/1997 | Japan | H02K 1/27 |
| 9-294344 | 11/1997 | Japan | H02K 1/27 |
| 9-294358 | 11/1997 | Japan | H02K 1/27 |
| 11-122853 | 4/1999 | Japan | H02K 1/27 |
| 11-98791 | 4/1999 | Japan | H02K 1/27 |

Primary Examiner—Nestor Ramirez
Assistant Examiner—Burt Mullins
Attorney, Agent, or Firm—Michael Best & Friedrich LLP

[57] ABSTRACT

A brushless permanent magnet machine that includes a combination of a fractional stator slot/rotor pole and a winding configuration to reduce cogging during operation of the machine. The stator has a series of teeth (preferably eighteen) which are surrounded by a series of coils. The coils are wound around the teeth and connected to a three-phase power supply in a manner that reduces cogging. The rotor has a series of slots (preferably sixteen). In the first embodiment, the coils are wound around every tooth, and the teeth are divided into sections of three, wherein each section of three teeth is connected to one phase of the power supply. In this embodiment, the fractional stator slot/rotor pole ratio is 18/16. In a second embodiment, the coils are wound around every other tooth, which provides for more space for winding the coils. In this embodiment, the fractional stator slot/rotor pole ratio is 9/16.

The permanent magnet machine further includes a design for a rotor lamination which provides sixteen magnet slots and eight slot connecting holes. The slot connecting holes join the magnet slots in pairs, which provide easy access to the magnets inserted in the rotor. The rotor design further provides a series of rotor holes located between the magnet slots which, with the slot connecting holes, provide for insulation of the machine from unwanted magnetic flux.

13 Claims, 6 Drawing Sheets

BRUSHLESS PERMANENT MAGNET MACHINE

BACKGROUND OF THE INVENTION

This invention relates to permanent magnet machines and, more particularly, to a permanent magnet machine having a unique fractional stator slot/rotor pole arrangement and a novel coil winding configuration.

The use of permanent magnet machines is abundant. A permanent magnet machine generally consists of a rotor that includes an even number of equally spaced magnets which have an alternating polarity. The magnets are placed around the inner radial surface of the rotor having a central shaft and a stack of laminations that are mounted on the shaft. The stack of laminations thereby hold a plurality of permanent magnets for producing an even number of magnetic poles on the periphery of the rotor. The conventional permanent magnet machine also includes a stator having a primary winding for generating a rotating magnetic field to provide rotation torque under energization by AC power. When a current is provided to the coils, the teeth of the stator become polarized and the permanent magnets in the rotor rotate due to the magnetic flux. In constant operation, the rotor is locked into particular synchronous speeds.

Electric motors with permanent magnet rotors often suffer from a condition called "cogging." Cogging is a variation in motor torque caused by variations in magnetic flux due to the alignment of the rotor and the stator teeth at various positions of the rotor. The cogging torque is superimposed on the driving torque developed by the magnetic flux caused by the fundamental component that causes the rotor to turn, but the cogging torque does not aid the driving torque. Rather, the cogging torque serves to negatively oscillate the rotor, and these oscillations are further transferred to the motor frame or equipment driven by the motor, thereby producing undesirable oscillation and noise. Cogging can therefore reduce the efficiency and the reliability of the motor.

Various methods have been implemented in the past to the cogging problem. One such method known to reduce cogging is to skew the permanent magnets in the rotor in either an angled or a herringbone pattern. Skewing the magnets in these ways, however, creates additional difficulties in that it is difficult to skew the position of a magnet in a rotor, and a skewed design further requires additional elements for effective operation, such as a sensor.

Another method used to reduce cogging is implementing a fractional stator slot/rotor pole combination. Such a combination has been commonly used to reduce cogging. An example is with disk drives, wherein the permanent magnet motor has stator slot/rotor pole ratio of 9/8. Such a combination is commonly used for high speed machines, but this stator slot/rotor pole arrangement commonly has a noise problem and it is often difficult to get the poles balanced.

Therefore, what is needed and not found in the prior art is a brushless permanent magnet machine that reduces the problem of cogging and that is easy to assemble and operate.

SUMMARY OF THE INVENTION

The current invention is a brushless permanent magnet machine that includes a combination of a fractional stator slot/rotor pole ratio, with the stator having a unique winding configuration for operation to reduce cogging. The combination of the fractional stator slot/rotor pole ratio, in conjunction with a unique winding around the stator, cause the motor to experience low cogging and have a high power density and low cost.

The rotor is made of a plurality of laminations. Each lamination has a plurality of slots for engaging a permanent magnet. Two embodiments for the rotor are disclosed. The first embodiment shows a rotor having sixteen mounting blocks and sixteen rotor slots for positioning the permanent magnets. This rotor is mounted on a hub to be used in the permanent magnet machine. The second embodiment of the rotor shows a spider design that also includes sixteen magnet slots for positioning the permanent magnets. The magnet slots of this second embodiment are joined by a slot connection hole. Therefore, this design allows for easy insertion of the magnets into the magnet slots through the use of the slot connection hole. Further, the rotor of the second embodiment is designed to be easily insertable over and around the shaft of a motor or generator without requiring an additional hub. Additionally, the second embodiment of the rotor includes a series of rotor holes between the slots that aid in insulating the machine from the magnetic flux present between the rotor and the stator. The second embodiment of the rotor can be stamped out of a sheet of lamination material, which eliminates the requirement for assembly as shown in earlier embodiments, and consequently reduces costs for producing the permanent magnet machine.

The stator of the present invention includes a ring and a plurality of teeth (preferably eighteen). A series of coils are wound around each stator tooth and connected to a three-phase power source. For a stator having eighteen teeth, for example, each phase is solely connected to the coils attached to six teeth of the stator. Three stator teeth in series along the inside surface of the stator are connected to one phase of the power supply, and the three stator teeth on the opposite side of the stator are connected to the same phase of the power supply. Therefore, when the coils are energized, the rotor will rotate according to the polarity of the teeth of the stator. The rotor operates in a most efficient manner to reduce cogging and to operate with a high power density.

In a second embodiment, half of the stator teeth are surrounded by coils as opposed to each tooth being surrounded by a coil (the coils are wound around every other tooth). Each coil is connected to one phase of the power source. Therefore, for a stator having eighteen teeth, one phase of the three phase power supply is connected to three individual teeth of the stator. Consequently, this embodiment therefore provides for two sets of coils to be wound around each tooth, and furthermore allows more coils to be wound around the tooth.

It is an object of the invention to provide a new stator winding configuration to allow for more efficient operation of a brushless permanent magnet machine to reduce cogging and to increase the power density.

It is a further object of the invention to provide a new fractional stator slot/rotor pole arrangement for reducing cogging in a permanent magnet machine.

It is a further object of the invention to provide a new rotor lamination which will reduce the magnetic flux directed towards the shaft of the rotor.

It is a further object of the invention to provide a new rotor lamination which will reduce the cost for production of a permanent magnet machine.

DESCRIPTION OF THE PREFERRED EMBODIMENTS

Figure 1:
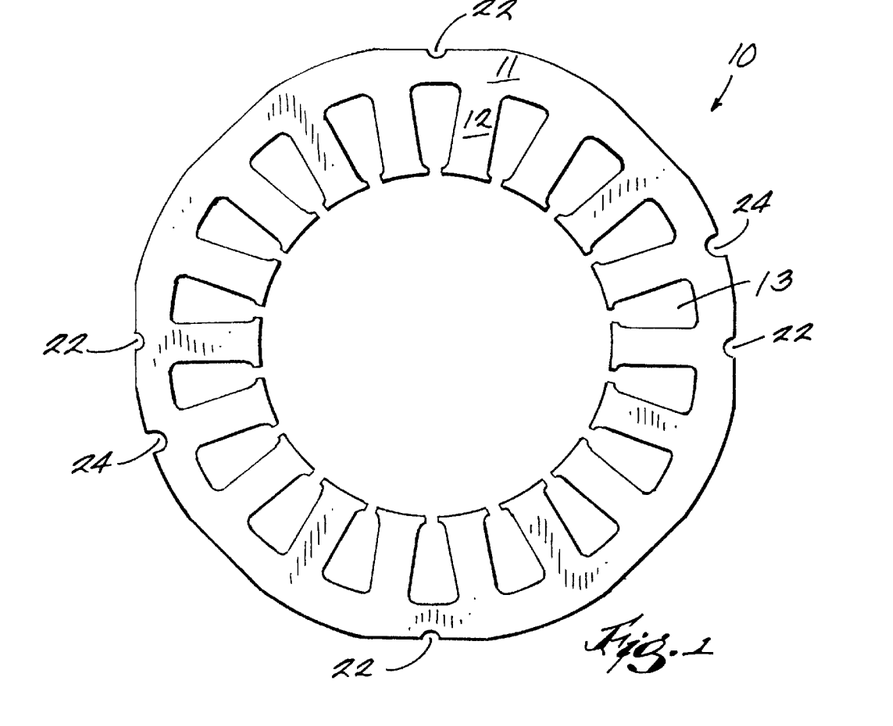
FIG. 1 is a plan view of a stator lamination of the present invention, the stator lamination having eighteen teeth.
Figure 2:
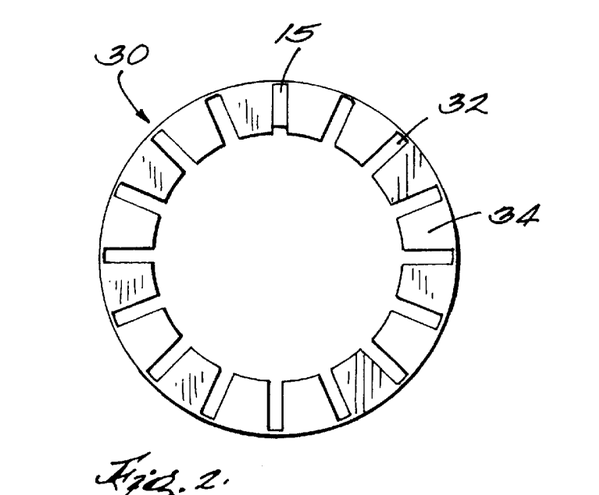
FIG. 2 is a plan view of a first embodiment of a rotor lamination of the present invention, the rotor lamination having sixteen slots.

Looking at FIGS. 1 and 2, there is shown the preferred embodiment of a stator lamination 10 and a rotor lamination 30 used in a permanent magnet machine (not shown) of the present invention. As seen in FIG. 1, the stator lamination 10 includes an annular ring 11 with a plurality of internally extending stator teeth 12. The stator lamination 10 of the present invention includes eighteen stator teeth 12 separated by eighteen stator slots 13. The stator slots 13 are uniform in size and shape. The stator teeth 12 are also uniform in size and shape. Consequently, the stator slots 13 and the stator teeth 12 are evenly spaced around the inside surface of the ring 11 of the stator lamination 10.

Looking at FIG. 2, a first embodiment of the rotor lamination 30 is shown with sixteen rotor slots 32 and sixteen rotor blocks 34 provided. A permanent magnet (not shown) is inserted into each rotor slot 32 and a cap (not shown) is then mounted between rotor blocks 34 and over the permanent magnet to secure the permanent magnet in the rotor slot 32. The permanent magnets are conventionally made of materials such as alnico or cobalt. This rotor lamination 30 can be assembled on a conventional non-magnetic hub or shaft (not shown). In such an embodiment, no bonding or wrapping of the magnets 15 is required, as is typical of conventional rotor designs.

Figure 3A:
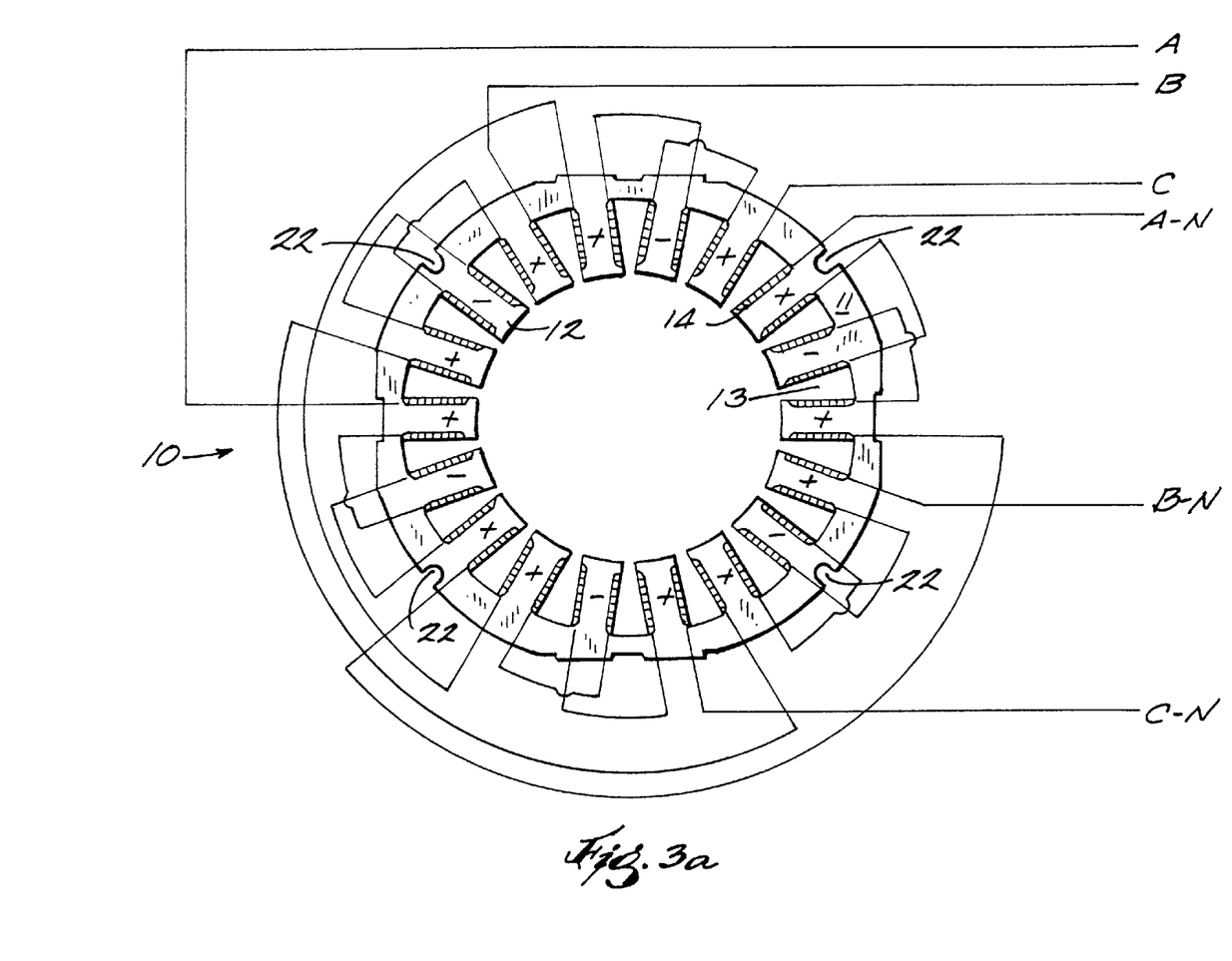
FIG. 3a is a plan view of a first embodiment of a stator assembly of the present invention, the stator assembly including a series of stator laminations of FIG. 1 and coils wound around each tooth of the stator, the coils being connected to a three phase power supply and having individual neutrals.
Figure 3B:
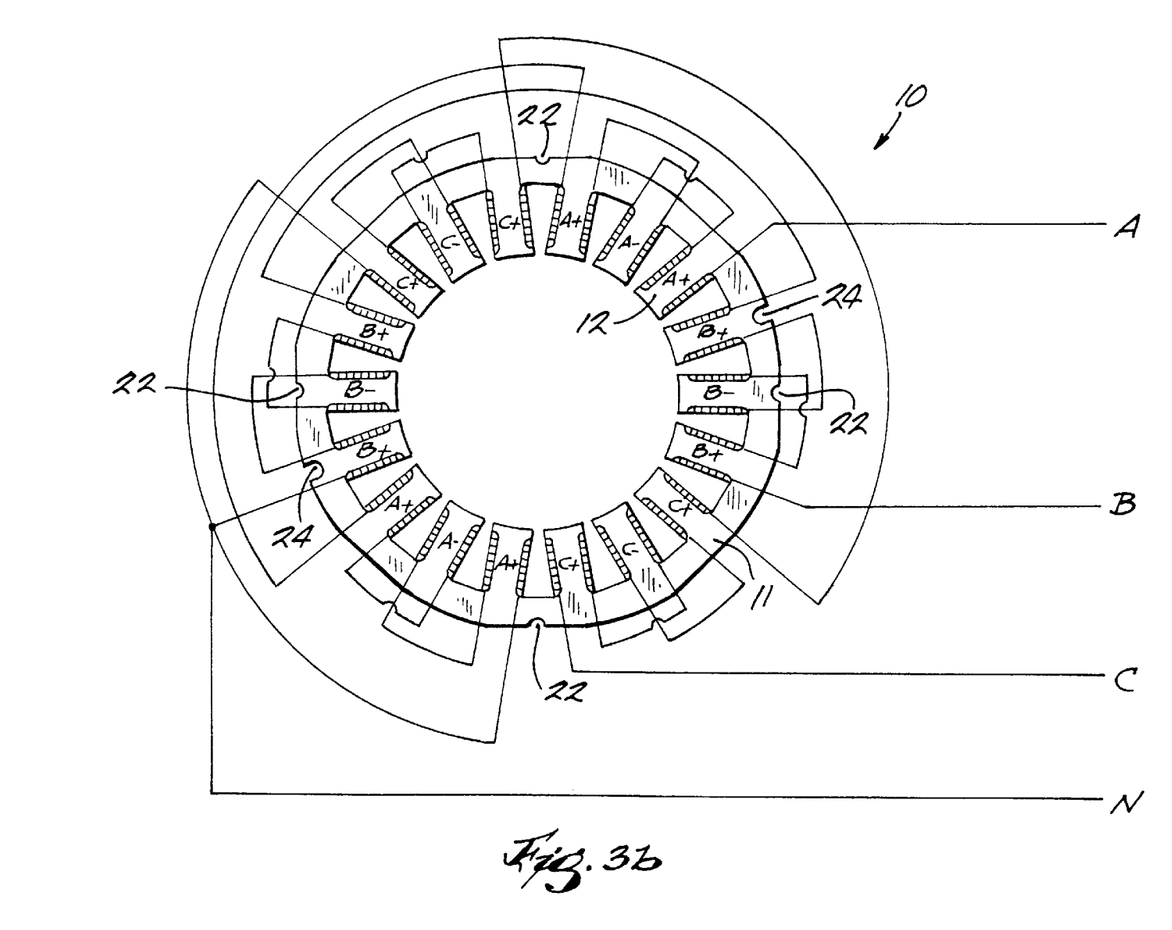
FIG. 3b is a plan view of a second embodiment of a stator assembly of the present invention, the stator assembly having a series of stator laminations and coils wound around each tooth, the coils being connected in a three phase power supply and having a common neutral.

The stator assembly of the invention further includes coils 14 connected to a three phase power supply, as shown in the two embodiments of the stator assembly illustrated in FIGS. 3a and 3b. Looking at the embodiment of FIG. 3a, a coil 14 is wound in place around each tooth 12 and electrically connected to one phase A, B, or C in the three phase power source. The coils 14 surrounding the teeth 12 are connected to each other such that one phase A, B, or C of the power source is connected to a group of six stator teeth 12. Each group of stator teeth 12 is further separated into two sections of stator teeth 12, which include three adjoining stator teeth 12.

Each section of three adjoining stator teeth 12 is connected to one phase A, B, or C and arranged on the stator 10 such that there are two groups of three adjoining stator teeth 12 connected to one phase A, B, or C of the power supply. The two groups of stator teeth 12 are positioned on the stator 10 such that they are opposite each other. Therefore, on a stator 10 that has eighteen teeth 12, three of the stator teeth 12 connected to one phase will be positioned on the stator 10 opposite the other three of the stator teeth 12. Additionally, the three adjoining teeth 12 will be of opposite polarity. FIG. 3a shows the coils 14 around the teeth 12 connected between phases A and A-N, B and B-N, and C and C-N. The stator 10 also has four weld notches 22 to further secure and steady the stator 10 in connection with the machine.

FIG. 3b is a second embodiment of the stator assembly. Like FIG. 3a, the stator assembly shown in FIG. 3b includes a coil 14 that is wound in place around each tooth 12 and electrically connected to one phase A, B, or C in the three phase power source. The coils 14 surrounding the teeth 12 are connected to each other such that one phase A, B, or C of the power source is connected to a group of six stator teeth 12. Each group of stator teeth 12 is further separated into two sections of stator teeth 12, which include three adjoining stator teeth 12.

Each section of three adjoining stator teeth 12 is connected to one phase A, B, or C of the power supply, and the two sections of stator teeth 12 are positioned on the stator 10 such that they are opposite each other. Therefore, on a stator that has eighteen teeth 12, three of the stator teeth 12 connected to one phase will be positioned on the stator 10 on the opposite side of the other three stator teeth of the group. Additionally, each tooth 12 of the section will be of opposite polarity to the adjoining teeth 12. FIG. 3b shows the coils 14 around the teeth 12 connected between phases A and common neutral N, B and common neutral N, and C and common neutral N. Furthermore, FIG. 3b also shows the two bolt holes 24 which allow for secure placement of the stator 10 and the machine. The stator 10 also has four weld notches 22 to further secure and steady the stator 10 to the machine.

The winding arrangement of the coils 14 around the teeth 12 in groups of three adjoining teeth 12 shown in FIGS. 3a and 3b is beneficial in that the stator 10 will always be balanced and have good alignment during operation of the machine. This is so because each phase A, B, and C of the power supply is represented equally on opposite sides of the stator 10.

Figure 4:
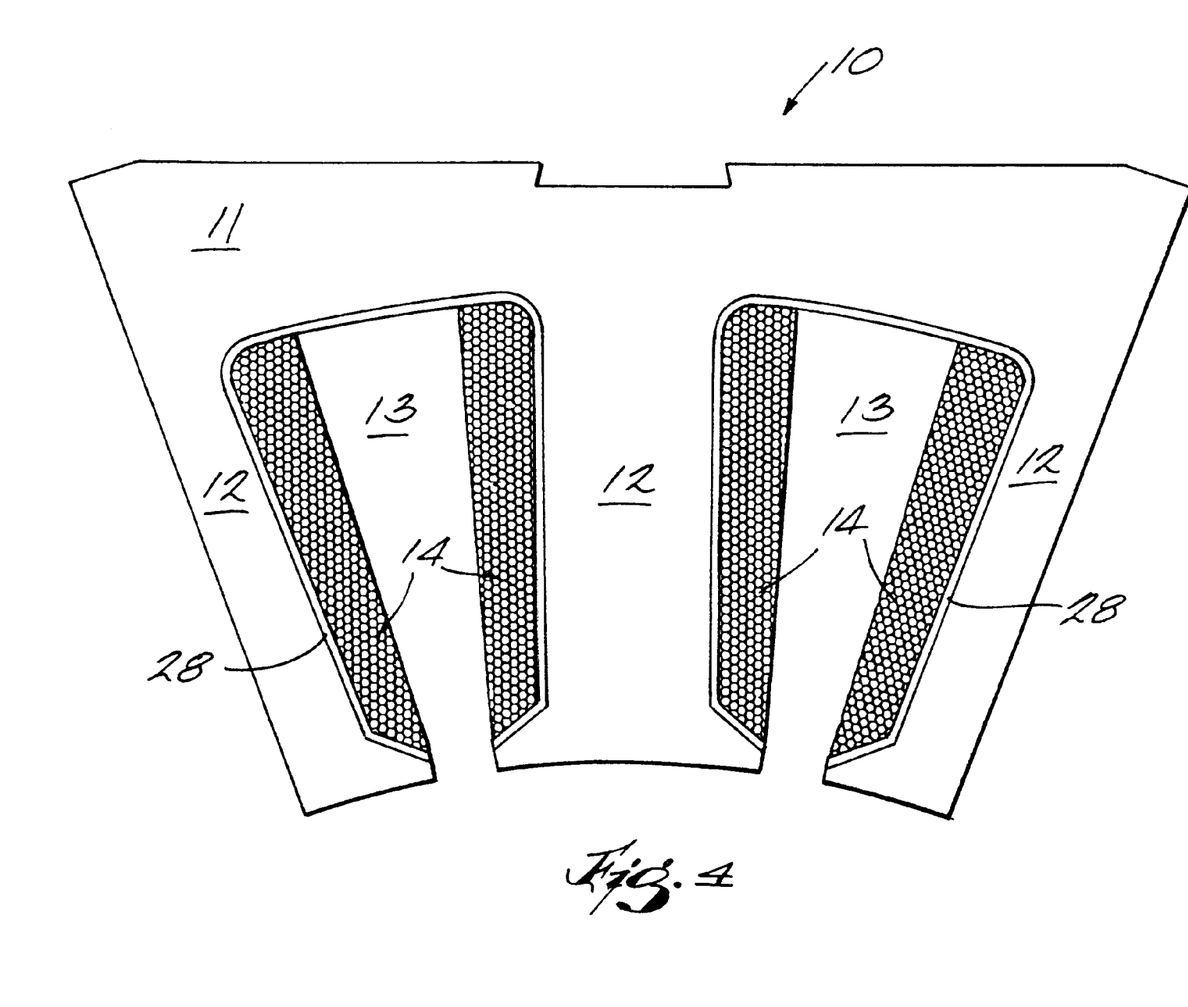
FIG. 4 is a plan view of a section of the stator assembly shown in FIGS. 3a and 3b, showing an enlarged view of the coils around the stator teeth.

FIG. 4 shows a plan view of a section of the stator 10 shown in FIGS. 3a and 3b. FIG. 4 shows the coils 14 around the stator tooth 12. In this embodiment, the number of turns of the coil 14 is ideally one-hundred twenty-one. Furthermore, this view shows a slot liner 28 (preferably made of mylar or injected plastic) which surrounds the slot 13 of the stator. The slot liner 28 reduces the magnetic flux transferred to the machine itself.

During the operation of the permanent magnet machine, each section of stator poles is turned off and the next section of stator poles is energized according to the power supply. The coils 14 around each tooth 12 are energized to create distinct and separate magnetic poles. The coils 14 are distributed around the stator 10 to produce a sinusoidal distribution around the ring 11. The machine is therefor driven with the three phase AC voltages, and the rotor 30 rotates synchronously with the rotating magnetic field created by the coils 14 energized around the stator teeth 12.

Therefore, the stator 10 and the rotor 30 described above form a fractional stator slot/rotor pole combination when joined together. The stator slot/rotor pole ratio provided by this design is 18/16, which will provide a low cogging machine with no skewing of the stator or rotor. By using this ratio of stator slots 13 to rotor poles and the winding configuration described above, the permanent magnet machine is inherently balanced, with each phase of the power supply being connected to the teeth 12 on opposing sides of the stator 10.

Figure 5:
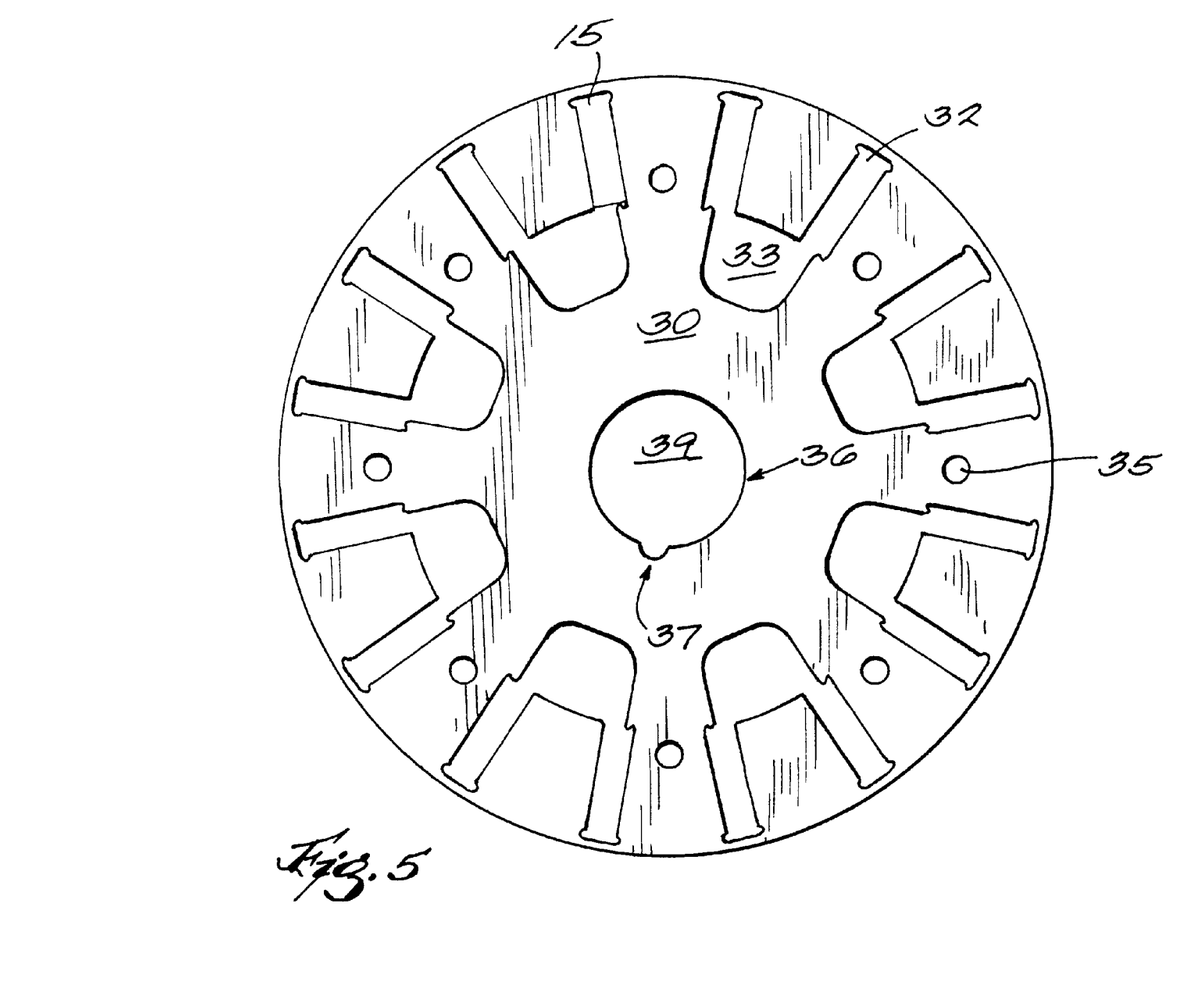
FIG. 5 is a plan view of a second embodiment of a rotor lamination of the present invention.

A second embodiment of the rotor lamination 30 is shown in FIG. 5. This rotor lamination 30 provides for easy assembly of the rotor 30 onto the rotor shaft 39 using a shaft hole 36 and a shaft notch 37. The shaft notch 37 is positioned with the shaft hole 36 to be complementary to the design of the shaft such that the rotor 30 can easily and securely be placed around the shaft. Further, as in the first embodiment, the rotor 30 has sixteen slots 32. Each of these slots 32 is used to secure a permanent magnet 15 within the rotor 30. The slots 32 are connected in pairs by a slot connecting hole 33. The slot connecting hole 33 is beneficial in that it provides access to the magnets 15 by the user so that the user can position and remove the magnets in the rotor slots 32.

A further benefit of the rotor lamination 30 shown in FIG. 5 is that this lamination 30 can easily be stamped out of an assembly line unlike other rotor designs. Moreover, since the rotor 30 is stamped out as a single lamination, the design does not require the user to assemble the various parts of the rotor 30. Consequently, the user only has to insert the magnet 15 into the rotor 30 for the rotor 30 to be ready for use, which makes the invention low cost compared to other brushless permanent magnet machines.

The rotor 30 further includes a series of rotor holes 35 that are evenly spaced between the slots 32. The rotor holes 35 and the slot connecting holes 33 are used to restrict magnetic flux to the non-magnetic area of the rotor 30, and therefore minimize magnetic flux in the machine itself.

Figure 6:
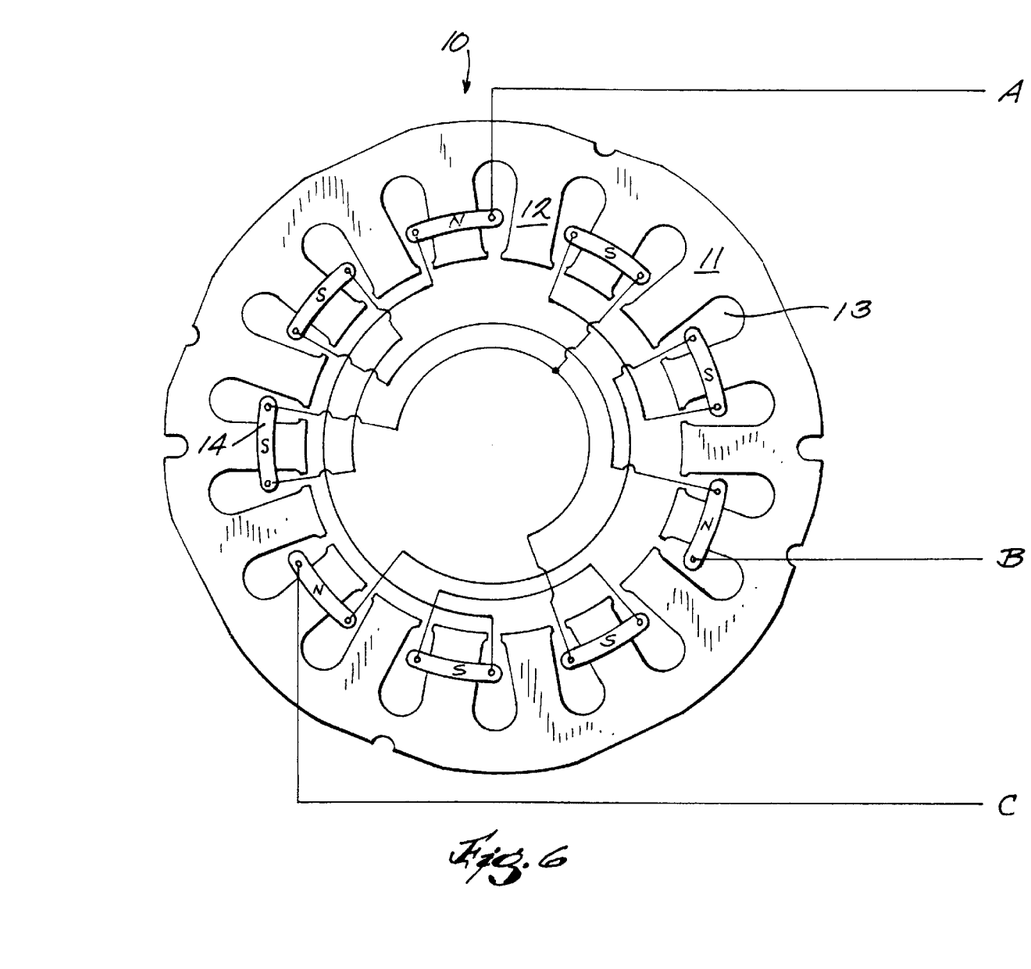
FIG. 6 is a plan view of a third embodiment of the stator assembly of the present invention, with coils wound around alternating teeth of the stator connected to a three phase power supply.

A third, preferred embodiment of the stator 10 and stator winding assembly of the present invention is shown in FIG. 6. FIG. 6 illustrates the position of the coils 14 that surround the teeth 12 of the stator 10. Although this stator 10 also has eighteen teeth 12 as with FIGS. 3a and 3b, it varies from those designs in that only nine teeth 12 are surrounded by a coil 14. In this embodiment, alternating teeth 12 are surrounded by coils 14 instead of every tooth 12, such that no two adjoining teeth 12 both have a coil 14 wound around them. Consequently, each phase A, B, or C of the three phase power source is connected to three teeth 12 in this embodiment as opposed to six teeth 12 as shown in the previously named embodiments. Further, by having coils 14 surrounding alternating teeth 12, the design provides for a greater number of turns around each tooth 12, which allows the magnetic flux to remain the same.

Moreover, because only alternating teeth 12 are wound by coils 14 in this embodiment, pace is provided so that the coils 14 are insertable onto the teeth 12 of the stator 10 rather than having to be wound in place as with the embodiments shown in FIGS. 3a and 3b. Consequently, the magnetic flux remains the same as previous embodiments, and the magnetic flux can even be increased by increasing the number of turns in each coil 14. For example, the number of turns in the embodiments shown in FIGS. 3a and 3b are preferably one-hundred twenty-one around each tooth 12. Because of the additional space in each slot 13 of the stator 10 shown in FIG. 6, more turns can be provided to maintain or increase the magnetic flux from the designs shown in FIGS. 3a and 3b. Consequently, although this embodiment does not provide for a coil 14 to surround each tooth 12, it allows for the same pattern of rotation as described in the previous embodiments.

Another benefit of this embodiment is that it is not as likely to develop phase to phase arcing as in other embodiments because no two phases are wound in the same slot 13 of the stator 10. Furthermore, this embodiment provides for a low cogging machine with no skewing of the stator or rotor, which makes it low cost to construct compared to embodiments that require skewing.

The present invention has been described in connection with a preferred embodiment thereof, and it will be understood that many modifications and variations will be readily apparent to those of ordinary skill in the art without departing from the spirit or scope of the invention and that the invention is not to be taken as limited to all of the details herein. Therefore, it is manifestly intended that this invention be limited only by the claims and the equivalents thereof.

What is claimed is:

1. A rotor and stator combination for use in a permanent magnet machine operating from a three-phase power supply, comprising:

a rotor having sixteen magnet slots;

a magnet inserted into each magnet slot;

a stator having eighteen teeth; and three groups of coils wound around the teeth of the stator, each group of coils being connected to one phase of the three-phase power supply, and each group of coils including a first, second and third coil wound around three stator teeth;

wherein the first and second coils are of the same polarity and are separated by a single stator tooth; and wherein the third coil has the opposite polarity of the first and second coils and is positioned on the stator opposite the tooth separating the first and second coils.

2. The combination of claim 1 wherein the rotor further comprises a plurality of rotor holes to minimize the magnetic flux in the rotor shaft.

3. The combination of claim 1 wherein the rotor further comprises:

a rotor shaft; and a shaft hole.

4. The combination of claim 1 wherein the rotor further comprises a slot connecting hole that connects two of the magnet slots.

5. The combination of claim 1 wherein the sixteen magnet slots form eight pairs of magnetic slots, wherein the rotor further comprises eight slot connecting holes, and wherein each slot connecting hole connects a respective pair of magnetic slots.

6. A permanent magnet machine operating from a three-phase power supply, the permanent magnet machine comprising:

a rotor having sixteen magnet slots;

a magnet inserted in each magnet slot;

a stator having eighteen teeth; and three groups of coils wound around alternating teeth of the stator, each group of coils being connected to one phase of the three-phase power supply to provide a magnetic flux, and each group of coils including a first, second, and third coil wound around three stator teeth;

wherein the first and second coils are of the same polarity and are separated by a single stator tooth; and wherein the third coil has the opposite polarity of the first and second coils and is positioned on the stator opposite the tooth separating the first and second coils.

7. The permanent magnet machine of claim 6 wherein the rotor further comprises a plurality of rotor holes to minimize the magnetic flux in the rotor shaft.

8. The permanent magnet machine of claim 6 wherein the rotor further comprises:

a rotor shaft; and a shaft hole.

9. The permanent magnet machine of claim 6 wherein the rotor further comprises a slot connecting hole that connects two of the magnet slots.

10. The combination of claim 6 wherein the sixteen magnet slots form eight pairs of magnetic slots, wherein the rotor further comprises eight slot connecting holes, and wherein each slot connecting hole connects a respective pair of magnetic slots.

11. A stator assembly for a three-phase motor operating from a three-phase power supply, the stator assembly comprising:

a stator having a plurality of teeth; and three groups of coils wound onto the stator, each group of coils being connectable to one phase of the three phase power supply, and each group of coils including a first, second and third coil wound around three stator teeth;

wherein the first and second coils are of the same polarity and are separated by a single stator tooth; and wherein the third coil has the opposite polarity of the first and second coils and is positioned on the stator opposite the single stator tooth separating the first and second coil.

12. The stator assembly of claim 11, wherein the stator has eighteen teeth.

13. The stator assembly of claim 11, wherein the three groups of coils are wound around alternating teeth of the stator.

* * * * *